UNITED STATES PATENT OFFICE.

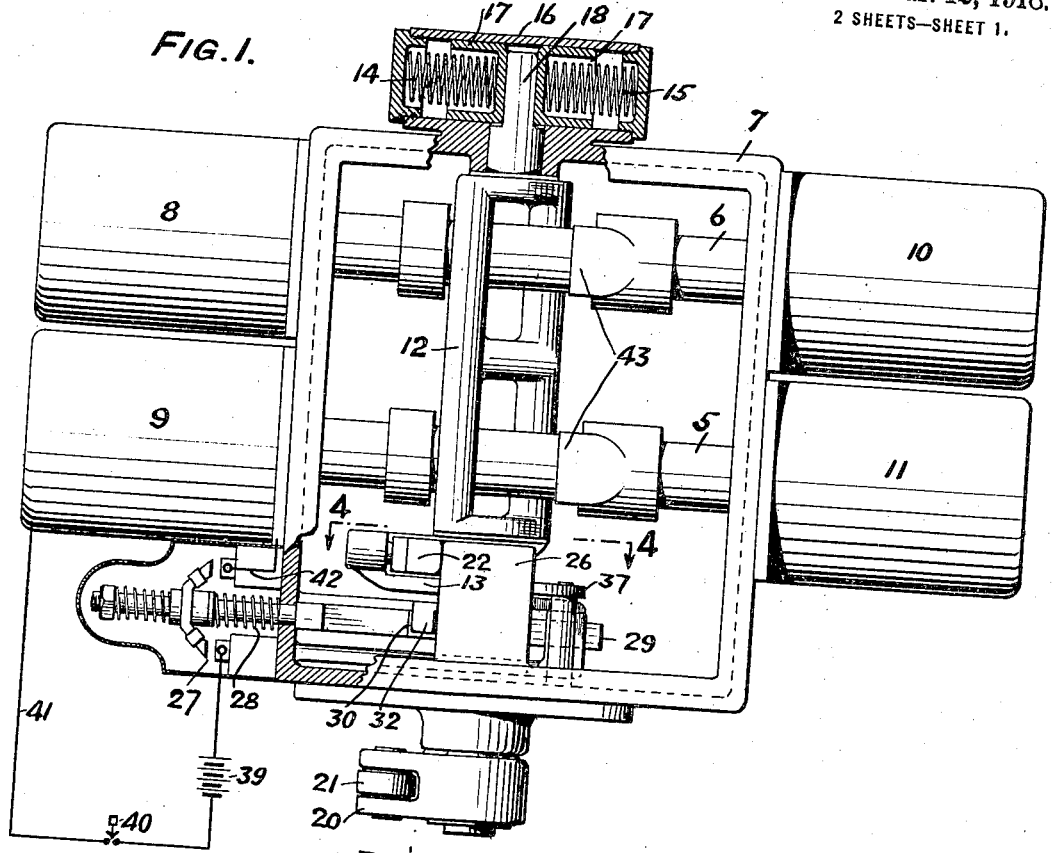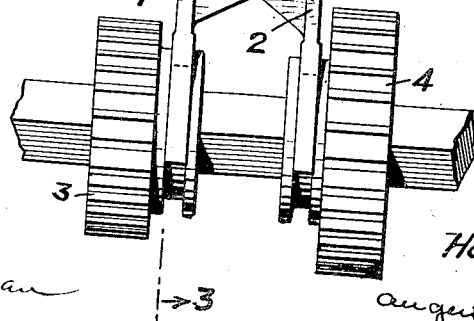

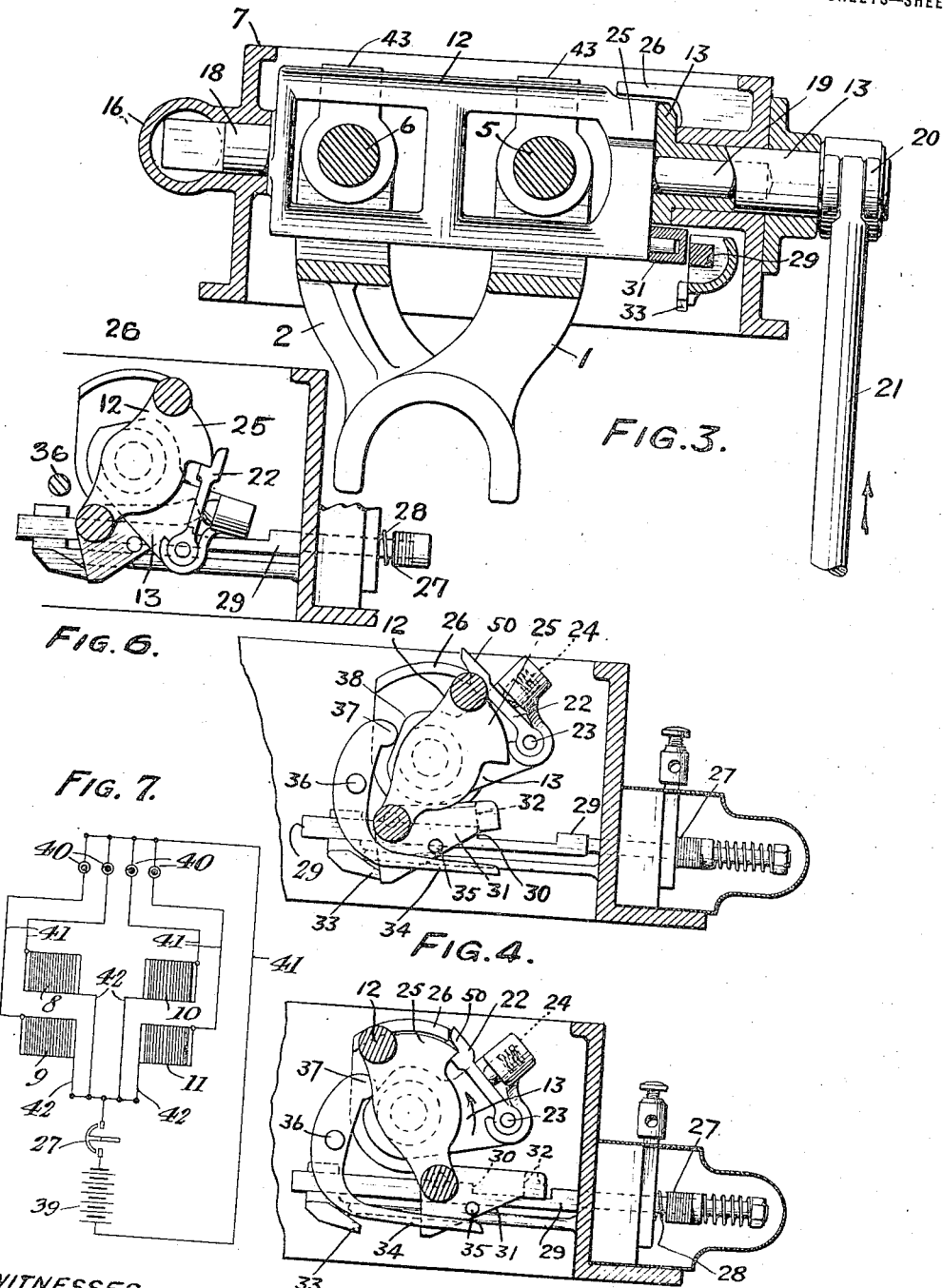

HOWARD SMALL, OF WYNCOTE, PENNSYLVANIA, ASSIGNOR TO VULCAN MOTOR DEVICES COMPANY, OF PHILADELPHIA, PENNSYLVANIA, A CORPORATION OF PENNSYLVANIA.

GEAR-SHIFT.

1,258,955.

Specification of Letters Patent. Patented Mar. 12, 1918.

Application filed February 28, 1914. Serial No. 821,640.

*To all whom it may concern:*

Be it known that I, HOWARD SMALL, a citizen of the United States, and a resident of Wyncote, in the county of Montgomery and State of Pennsylvania, have invented certain new and useful Improvements in Gear-Shifts, of which the following is a specification.

The principal objects of the present invention are, first to normally make the power that is used for shifting the gears ineffective, and to automatically make it available for that purpose only when the clutch is out and then for so long as is necessary for compelling the completion of the gear shift which has been selected, and second, to automatically make the power that is used for shifting the gears ineffective when the gears have been designably brought to and left in neutral position.

Other objects of the invention will appear from the following description, and generally stated the invention consists in the combination of means including power for shifting gears, mechanism for selecting the gear to be shifted, clutch mechanism, provisions actuated by the clutch mechanism for bringing gears to neutral position, devices actuated by the clutch mechanism for making the power available after the gears have been placed in neutral position, and mechanism responsive to gear shifts for making such power ineffective by the completion of the gear shift, and the invention further comprises the combination of means including power for shifting gears, clutch mechanism, provisions actuated by the clutch mechanism for bringing gears to neutral position, devices actuated by the clutch mechanism for making the power available after the gears have been placed in neutral position, and a release actuated by the clutch mechanism and adapted to make the power unavailable when no gear shift has been shifted and when it is desired to get the gears into neutral position with the power unavailable, and further the invention consists in the improvements to be described and finally pointed out in the claims.

In the accompanying drawings, Figure 1 is a top or plan view, partly in section, of so much of a gear shift as is necessary to illustrate features of the invention.

Fig. 2, is a transverse sectional view of Fig. 1.

Fig. 3, is a sectional view taken on the line 3—3 of Fig. 2,

Figs. 4 and 5 and 6 are sectional views taken on the line 4—4 Fig. 1, looking in the direction of the arrows and showing three positions of the parts, and Fig. 7, is a diagrammatic view of a selector in its relation to the other elements of the device.

In the drawings 1 and 2 are shippers or shifters which when moved effect different speeds. As shown they are connected with the change gears 3 and 4 of a change speed mechanism, not shown, but of which some type is to be found upon pretty much all automobiles. The shippers or shifters 1 and 2 are connected with the cores or core bars 5 and 6, the latter are endwise movable in a generally rectangular frame 7 and are operated upon by the magnets or windings 8, 9, 10 and 11, projecting from and carried by the frame 7. There is a cam or yoke 12 through openings in which pass the core bars 5 and 6. This cam or yoke is journaled at one end in the frame 7 and at the other end in a sleeve 13, turnably mounted in the frame 7. The yoke or cam 12 has a normal position to which it is automatically returned and which corresponds with the free position of the shippers or shifters 1 and 2. In the drawings the gears 3 and 4 and the core bars 5 and 6 are shown in the positions that they occupy when the gears 3 and 4 are not in mesh with those gears, not shown but well understood, with which they respectively engage to bring about changes of speed. The mechanism shown for permitting turning motion of the cam or yoke 12 and for returning it to its normal position comprises the opposed springs 14 and 15 arranged in a barrel 16 applied to the side of the frame 7 and acting on the plungers 17, which operate upon flats formed on the end of the trunnion 18 by which the cam or yoke is pivoted in the frame 7. The sleeve 13 receives the trunnion 19 by which the cam or yoke is turnably mounted and is connected as by a crank arm 20 with the rod 21 through which power is applied for returning the shippers 1 and 2 to neutral position. The rod 21 in the case of an automobile is connected with and so becomes a part of the clutch mechanism and it is so connected that as the clutch is thrown out the rod 21 is moved upward as in Fig. 3.

Between the sleeve 13 and the cam or yoke 12 there is an automatic locking and releasing mechanism. As shown this comprises a dog or pawl 22 pivotally connected with the sleeve 13 as at 23 and held up to its work as by a spring 24 and a segmental projection 25 connected with the yoke or cam 12 and a fixed stop 26.

In the present instance the power used for shifting the gears is electrical in its nature so that there is an electric switch 27 for rendering it available and unavailable but electric power as is well known can be replaced by other power. This switch 27 is normally opened as by a spring 28 and it is provided with a stem 29 slidable endwise and provided with a projection 30. 31 is a trigger pivoted to the yoke or cam 12 and having an arm 32 that extends in Fig. 4 toward the plane of the paper and rides on top of the stem 29, in position to engage or disengage the projection 30. This trigger 31 can be thrown out by a fixed stop 33 upon which its heel can impinge and by the end 34 of a lever adapted to collide with a pin 35 projecting from the trigger. This lever is pivoted at 36 and its end 37 is operated upon by a cam 38 on the sleeve 13.

The selective mechanism will be well understood and it serves to direct current to one or the other of the electro-magnets or windings when the switch 27 is closed, it being understood that until the switch 27 is closed there is no current that can reach the magnets although the selective mechanism may have established circuits, or more accurately, paths for the current when the switch 27 is closed. To illustrate this in a diagrammatic way I have shown a storage battery 39 as the source of current and the push button 40 as a part of the selective mechanism and I have also shown a circuit by the wires 41 and 42 which includes the winding of the coil 9. It will, of course, be understood that there are other push buttons and wires for the other windings 8, 10 and 11 and that the switch 27 controls the supply of current in every case. Each core bar 5 and 6 is provided with a projection 43 and with a projection 44, the latter being a part of the shipper in the construction chosen for illustration.

I have spoken of selective mechanism and have diagrammatically illustrated it by the push button 40. I may say that in this selective mechanism there is a neutral button or device which performs the single function of breaking all the circuits and is intended to be used when it is desired to get all the gears into neutral position. It will, of course, be understood that the other buttons are to be pushed according to the particular gear that is to be shifted and the time when they are pushed, whether before the clutch is thrown out or afterward, is not material, although as a matter of convenience it is preferred by some people to push the button corresponding to the shift desired and to then throw out the clutch and in the following description reference will be made to that procedure.

To effect a gear shift it will be assumed that the core bar 5, and the gear 3, are to be moved toward the left, in Fig. 2. For this purpose the push button 40, is pushed, establishing a circuit or path but no current flows because the switch 27, is open. The result of this is that a selection has been made as to the shift desired. The clutch lever or mechanism is moved with the result that during the first part of the movement the clutch is thrown out and during the remainder of the movement the following things occur: The rod 21, is moved upward, in Fig. 3, and turns the sleeve 13 (Fig. 5) in counter-clock-wise direction. This movement of the sleeve causes the dog 22, by engaging the end of the segment 25, to turn the cam or yoke. In turning, the bars of the cam or yoke acting on the projections 43 and 44, return any core bar that may be out of the position shown in Fig. 1, to that position thus bringing the gears into neutral position. The turning motion of the cam or yoke shifts the trigger 31, toward the right in Fig. 5, so that its projecting arm merely slides along the stem 29. The result is that all of the gears are in neutral position and the switch 27, remains open. As this turning continues the dog 22, or more accurately the finger 50, at its free end rides up on the fixed stop 26, and causes the dog to release the yoke. Thereupon the yoke or cam being free is shifted clock-wise by the springs 14 and 15 and the arm 32 on the trigger engages the projection 30 on the stem 29 and closes the switch. The result of closing the switch is to energize the magnet 9 so that it pulls the core bar 5 toward the left in Fig. 2, shifting the gear 3 toward the left and causing the projection 43 to tap the top bar of the yoke and thus give it a little additional movement in the direction in which it is moving, i. e., clock-wise in Fig. 4. The result of this is that the heel of the trigger 31 strikes the fixed stop 33, thus turning the trigger and lifting the trigger arm 32 clear of the projection 30 so that the switch 27 opens under the power of its spring. From the foregoing description it is evident that the circuit is only closed as long as is necessary to effect a gear shift and when the gear shift has been effected the circuit is broken.

It is unnecessary to describe the operation in connection with each of the magnets, because the description in connection with the magnet 9 will suffice for a complete understanding of the invention.

To those skilled in the art it is evident that there are times when it is desired to get all of the gears into neutral and leave them there without making any gear shift and since, so far as has been described in connection with the operation of the device, the circuit is broken or the switch 27 is released by the act of shifting a gear in so far as that gives the yoke the final turn which brings the trigger 31 into contact with the stop 33, it follows that if no gear shift were made the switch 27 would be left closed which is undesirable because if that were the case and a button were thereafter pushed there would be an immediate gear shift, possibly while the clutch was in, which would be undesirable. All of this is avoided in the following way. When the gears are to be put in neutral there is no path for the current to the various magnets, even though the switch 27 be closed. To get all the gears to neutral the clutch is thrown out and the operation is exactly as has been described, except that the return movement of the rod 21 causes the cam 38, acting on the end 37 of the lever to cause the end 34 thereof to contact with the pin 35 and thus lift the arm 32 clear of the projection 30 and so release the stem of the switch 27 which is thereupon opened by its springs. The result is that the gears are left in neutral position with the switch 27 open and that is the position shown in Figs. 1 and 2.

It will be obvious to those skilled in the art that modifications may be made in details of construction and arrangement, hence the invention is not limited as to those matters or is it intended to limit it by the language used or to limit it in any way further than the prior state of the art may require, but

What I claim is:

1. In a gear shifting mechanism the combination of power means for shifting gears, mechanism for selecting the gear to be shifted, clutch mechanism, provisions actuated by the clutch mechanism for bringing gears to neutral position, devices actuated by the clutch mechanism for making the power available after the gears have been placed in neutral position, and mechanism responsive to gear shifts for making such power ineffective by the completion of the gear shift, substantially as described.

2. In a gear shifting mechanism the combination of power means for shifting gears, clutch mechanism, provisions actuated by the clutch mechanism for bringing gears to neutral position, a power controller, devices actuated by the clutch mechanism for closing the power controller after the gears have been placed in neutral position, and releasing mechanism actuated by the clutch mechanism and adapted to open the power controller when no gear has been shifted and when it is desired to get the gears into neutral position with the power unavailable, substantially as described.

3. In a gear shifting mechanism the combination of gear shifters, power devices for operating the shifters, a normally positioned turnable cam adapted to move the shifters and to be moved by the shifters, a controller normally cutting off the power, trigger mechanism carried and actuated by movement of the cam to close the controller, a stop for releasing the trigger mechanism to permit the controller to open, pawl mechanism for turning the cam in one direction to position the shifters and close the controller, a stop for freeing the pawl mechanism to permit the cam to turn in the other direction, and means connected with the shifters for additionally turning the cam in the last mentioned direction to cause the trigger mechanism to coöperate with its stop, substantially as described.

4. In a gear shifting mechanism the combination of gear shifters, a cam adapted to position the shifters, means for moving the cam including a controller for normally making the power unavailable, devices operated by movement of the cam for actuating the controller to make the power available, and mechanism operated by said cam moving means for freeing said devices to make the power unavailable, substantially as described.

HOWARD SMALL.

Witnesses:
CLIFFORD K. CASSEL,
K. M. GILLIGAN.